March 7, 1933.  A. H. SNYDER  1,900,307
STORAGE BATTERY
Filed Jan. 10, 1927  2 Sheets-Sheet 1
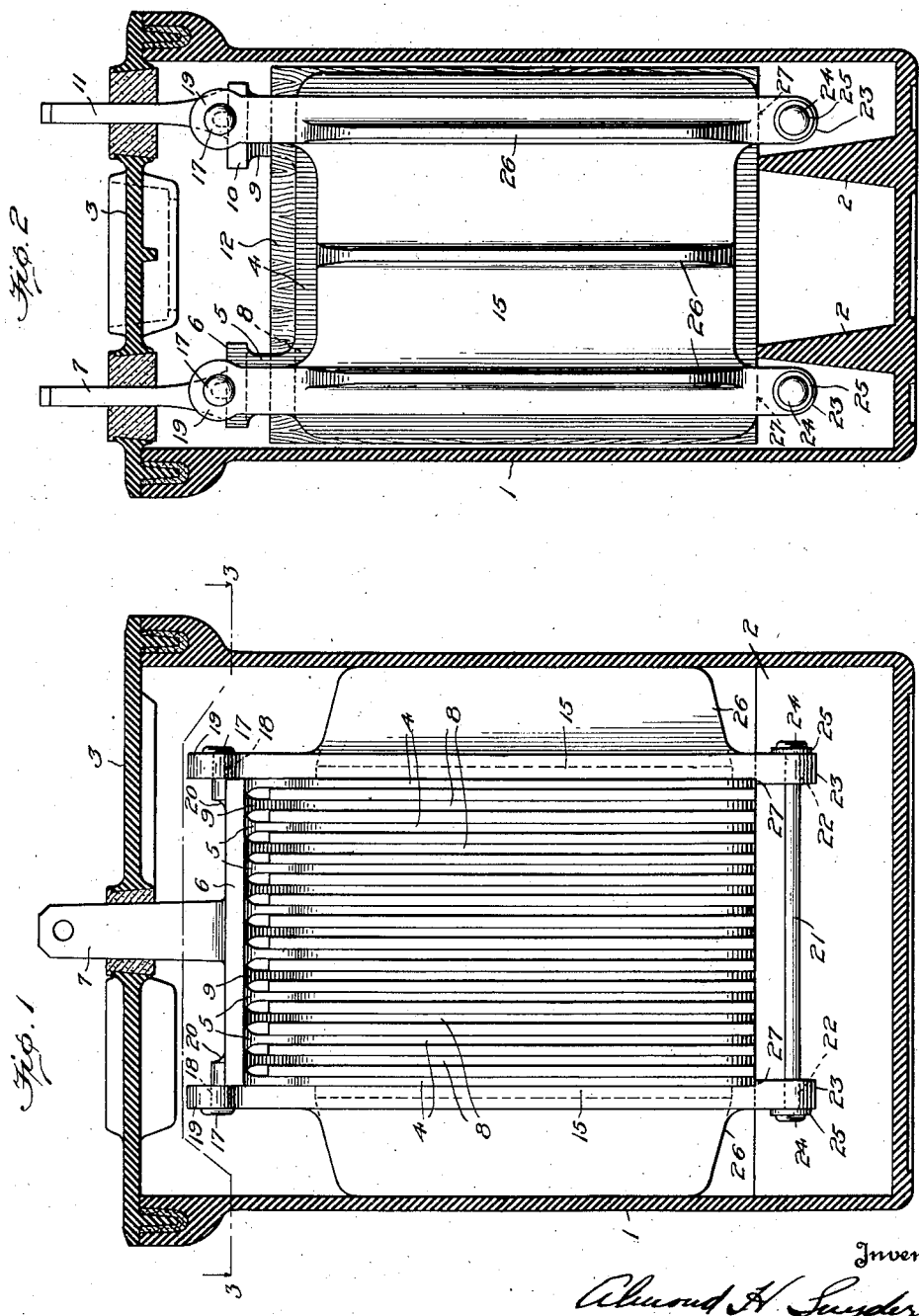
Inventor
Almond H. Snyder
By
His Attorney March 7, 1933.  A. H. SNYDER  1,900,307

STORAGE BATTERY

Filed Jan. 10, 1927   2 Sheets-Sheet 2

Inventor
Almond H. Snyder
By
his Attorney

Patented Mar. 7, 1933

1,900,307

UNITED STATES PATENT OFFICE

ALMOND H. SNYDER, OF LANCASTER, NEW YORK, ASSIGNOR, BY MESNE ASSIGNMENTS, TO GOULD STORAGE BATTERY CORPORATION, OF DEPEW, NEW YORK, A CORPORATION OF DELAWARE

STORAGE BATTERY

Application filed January 10, 1927. Serial No. 160,141.

My invention relates to storage batteries and, more particularly, to refill units for storage batteries.

It has for an object the provision of means for uniting the plates and separators so that they may be handled safely and conveniently as a unit.

Another object of my invention is to provide means for holding the plates and separators securely between end pieces so as to control the degree of compression to which the separators are subjected.

A further object of my invention is to provide means for securing the plates and separators between end pieces provided with extensions so that the assembled unit may be used as a refill to replace units of different design and capacity requiring more space.

Other objects of my invention will become apparent from a consideration of the accompanying specification and drawings embodying a preferred form of my invention in which:

Figure 1 is a longitudinal section view through the battery container showing the unit assembly in side elevation.

Figure 2 is a transverse sectional view through the battery container showing the unit assembly in end elevation.

Figure 4:
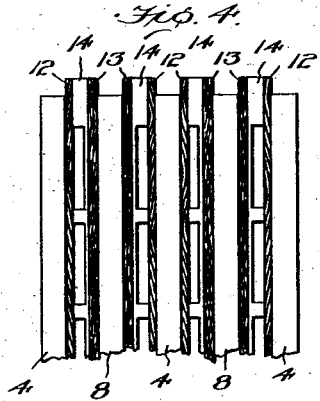
Figure 4 is an enlarged section in plan showing an arrangement of the separators.

Considering the drawings in further detail, 1 may be a container of rubber or other suitable material provided with the bottom supports 2 and the cover 3. Within the jar or container 1 may be arranged a group of negative plates 4 having upwardly extending portions 5 connected to the negative bus bar 6 which may be integral with the negative terminal 7. Likewise, there may be a group of positive plates 8 having upwardly extending portions 9 connected to the positive bus bar 10 which may be integral with the positive terminal 11. Between positive and negative plates, I may use a separator, as shown in Figure 4, comprising a sheet of treated wood 12 against the negative plates, a sheet or mat of glass wool felt 13 against the positive plates with a rubber or other suitable diaphragm 14 interposed between the glass wool and wood sheets.

Figure 3:
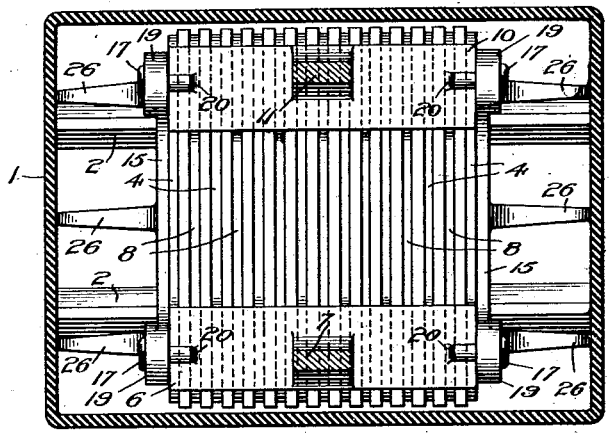
Figure 3 is a sectional view along the line 3—3 of Figure 1 showing the elements in plan.

In order to unite the groups of positive and negative plates with their separators into an assembly unit that may be readily handled and shipped without injury, I may tie these elements together between end plates of insulating material 15. The upper ends of the plates 15 may be secured to the bus bars 6 and 10 by means of the headed pins or studs 17 which pass through the holes 18 in the upwardly extending portions 19 and are lead burned to the bus bars as shown at 20 in Figures 1 and 3. The lower portions of the end plates 15 may be tied together by the rods 21 which pass through the holes 22 in the extensions 23 and are headed as shown at 24 against the washers 25. By determining the length of the bus bars 6 and 10 and the rods 21, I may control the end pressure applied to the assembled units. The rods 21, which may be of antimony-lead or other acid-proof material, are spaced sufficiently below the assembled plates to prevent any material which may find lodgement thereon causing a short circuit.

In providing refills for old batteries in which improved forms of battery elements are used, the new units may weigh less and occupy less space. In order to use the old containers or jars with improved new refill units, I may add to the end plates 15 the flanges 26 dimensioned in width to properly space the battery units with respect to the container walls so that the units will be held securely against undue motion and the terminals correctly alined with respect to the cover openings.

Whereas my invention is applicable to electric batteries in general, it finds particular application in connection with batteries using glass wool felt as a separating element, for it is important in these batteries that, after the glass wool separators are assembled at the factory, the elements be held securely together so as to prevent relative motion that may injure the separator. To this end, and as an added precaution, it may be desirable to provide a step 27 in the lower projections 23 of the end pieces 15 to receive the lower edge of the end elements. In this connection, attention is also invited to the fact that, in my invention, the bus bars themselves form two of the four tie bars which are rigidly united through insulating end plates to form a compact rigid unit that will stand unusually rough handling without injury.

Having now described my invention, I claim:

1. In an electric battery, the combination with a container, of a group of positive plates, of a group of negative plates, bus bars connecting the plates of each group, separators interposed between said plates and end pieces connected at the top to said bus bars and at the bottom by tie rods to each other, said end pieces having projecting portions adapted to form, when united with said plates and separators, an assembly unit of the desired dimensions, said projecting portions being engageable with the interior surface of the container to prevent lateral displacement of the unit.

2. In an electric battery, the combination with a container, or groups of positive and groups of negative plates, insulating members adapted to contact the outermost plates and means for connecting said insulating members above and below said plates, and means on said insulating members integral therewith engageable with the container to hold the assembled groups of plates in proper position within the cell.

3. In a storage battery, the combination of groups of positive and negative plates arranged in alternation with the plates of the respective groups connected by bus bars united thereto, separators between the successive plates, and end members of insulating material located outwardly of the endmost plates and substantially covering the same, metallic elements extending through the upper portions of said end members and united to the adjacent bus bars, metallic tie rods extending through the lower portions of said end members for connecting the same and maintaining all the plates and separators in closely clamped relation to define a unitary structure, and means on said end members for supporting the adjacent plates.

4. In a storage battery, the combination of groups of positive and negative plates arranged in alternation with the plates of the respective groups connected by bus bars united thereto, separators between the successive plates, and end members of insulating material located outwardly of the endmost plates and substantially covering the same, metallic elements extending through the upper portions of said end members and united to the bus bars, metallic tie rods extending through the lower portions of said end members for connecting the same and maintaining all the plates and separators in closely clamped relation to define a unitary structure, an enclosing jar for the unit, and means projecting outwardly from said end members engageable with the interior of the jar for centering the unit with respect thereto.

5. In a storage battery, the combination of groups of alternately arranged positive and negative plates having separators interposed between the same, bus bars united to and connecting the plates, end members of insulating material located against the endmost plates and formed at their upper corners with upwardly extending apertured ears and formed at their lower corners with apertured ears projecting downwardly, metallic retaining elements projecting toward each other through said first named ears and having their inner ends burned to the bus bars, and metallic tie rods extending through the opposite ones of the second named ears for holding all the plates and separators and end members in clamped relation to define a unitary structure, said tie rods having their ends upset.

6. In a storage battery, the combination of groups of alternately arranged positive and negative plates having separators interposed between the same, bus bars united to and connecting the plates, end members of insulating material located against the endmost plates and formed at their upper corners with upwardly extending apertured ears and formed at their lower corners with apertured ears projecting downwardly, metallic retaining elements projecting toward each other through said first named ears and having their inner ends united to the bus bars, and metallic tie rods extending through the opposite ones of the second named ears for holding all the plates and separators and end members in clamped relation to define a unitary structure, each end member being provided with a shoulder on its inner face forming a seat for the adjacent plate.

7. In a storage battery, the combination of groups of alternately arranged positive and negative plates having separators interposed between the same, bus bars united to and connecting the plates, end members of insulating material located against the endmost plates and formed at their upper corners with upwardly extending apertured ears and formed at their lower corners with apertured ears projecting downwardly, metallic retaining elements projecting toward each other through said first named ears and having their inner ends united to the bus bars, and metallic tie rods extending through the opposite ones of the second named ears for holding all the plates and separators and end members in clamped relation to define a unitary structure, each end member being provided with a plurality of longitudinally extending ribs projecting outwardly therefrom at substantially right angles thereto, said ribs being adapted to engage the wall of an enclosing jar for effecting centering of the unitary structure with respect to the jar.

8. In a storage battery assembly, groups of alternately arranged positive and negative plates having separators interposed therebetween, bus bars joining the plates of the respective groups, end members of insulating material disposed against the outermost plates, and means connecting said end members outwardly of the plates for binding the plates and separators into a compact unit, said members being provided with outwardly extending integral ribs adapted to engage against the inner surface of a container for maintaining the unit in proper relation thereto by preventing lateral displacement thereof.

9. In a storage battery assembly, a container groups of alternately arranged positive and negative plates having separators interposed therebetween, bus bars joining the plates of the respective groups, end members of insulating material disposed against the outermost plates, and means connecting said end members outwardly of the plates for binding the plates and separators into a compact unit, each of said end members being provided with a plurality of spaced longitudinally extending ribs having a truss action for stiffening the end members, said ribs bearing against the inner walls of the container throughout the major portion of the height thereof.

In testimony whereof I affix my signature.

ALMOND H. SNYDER.